(12) United States Patent
Fahldieck

(10) Patent No.: US 10,994,940 B1
(45) Date of Patent: May 4, 2021

(54) APPARATUS FOR GUIDING CONTAINERS FOR A CONVEYOR

(71) Applicant: KHS GmbH, Dortmund (DE)

(72) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 15 days.

(21) Appl. No.: 16/628,066

(22) PCT Filed: Jun. 28, 2018

(86) PCT No.: PCT/EP2018/067402
§ 371 (c)(1),
(2) Date: Jan. 2, 2020

(87) PCT Pub. No.: WO2019/007798
PCT Pub. Date: Jan. 10, 2019

(30) Foreign Application Priority Data

Jul. 7, 2017 (DE) ...................... 10 2017 115 239.3

(51) Int. Cl.
*B65G 21/20* (2006.01)
*B65G 21/06* (2006.01)

(52) U.S. Cl.
CPC ......... *B65G 21/2072* (2013.01); *B65G 21/06* (2013.01); *B65G 2201/0244* (2013.01); *B65G 2207/26* (2013.01)

(58) Field of Classification Search
CPC ..... B65G 21/20; B65G 21/2054; B65G 39/18
USPC ............. 198/836.1, 836.2, 836.3, 836.4, 837
See application file for complete search history.

(56) References Cited

U.S. PATENT DOCUMENTS

| 717,923 | A | 1/1903 | Rapp | |
|---|---|---|---|---|
| 5,119,926 | A * | 6/1992 | Draebel | B65G 17/086 198/836.3 |
| 5,943,838 | A | 8/1999 | Madsen et al. | |
| 6,578,702 | B2 * | 6/2003 | Falkowski | B65G 21/2072 198/575 |
| 6,591,973 | B2 * | 7/2003 | Smith | B02C 18/225 198/550.2 |
| 6,786,672 | B2 * | 9/2004 | Ledingham | B65G 21/06 198/836.3 |
| 7,571,802 | B2 * | 8/2009 | Bowman | B65G 21/2081 198/836.1 |
| 7,748,523 | B2 * | 7/2010 | Robertson | B65G 21/2072 198/836.1 |
| 8,613,355 | B2 * | 12/2013 | Andreoli | B65G 21/2072 198/836.1 |

(Continued)

FOREIGN PATENT DOCUMENTS

| DE | 10 2013 105018 | 11/2014 |
|---|---|---|
| WO | WO 2007/021197 | 2/2007 |
| WO | WO 2014/165545 | 10/2014 |

*Primary Examiner* — Douglas A Hess
(74) *Attorney, Agent, or Firm* — Occhiuti & Rohlicek LLP

(57) ABSTRACT

A container guide includes a guide rail and a single piece having a main body and retainers. At least one of the retainers is arranged in either a through passage or a recess in a surface-area portion of the main body. Each retainer includes a bent rail bar and a rail support. A portion of the rail support comprises a support arm that is perpendicular to a plane defined by the surface-area portion of the main body. The guide rail is arranged directly on the support arms for guiding the container.

20 Claims, 7 Drawing Sheets

(56) References Cited

U.S. PATENT DOCUMENTS

| | | | |
|---|---|---|---|
| 10,059,526 B2 * | 8/2018 | Peil | B65G 21/2072 |
| 10,766,708 B2 * | 9/2020 | De Carvalho Costa | B65G 21/2072 |

* cited by examiner

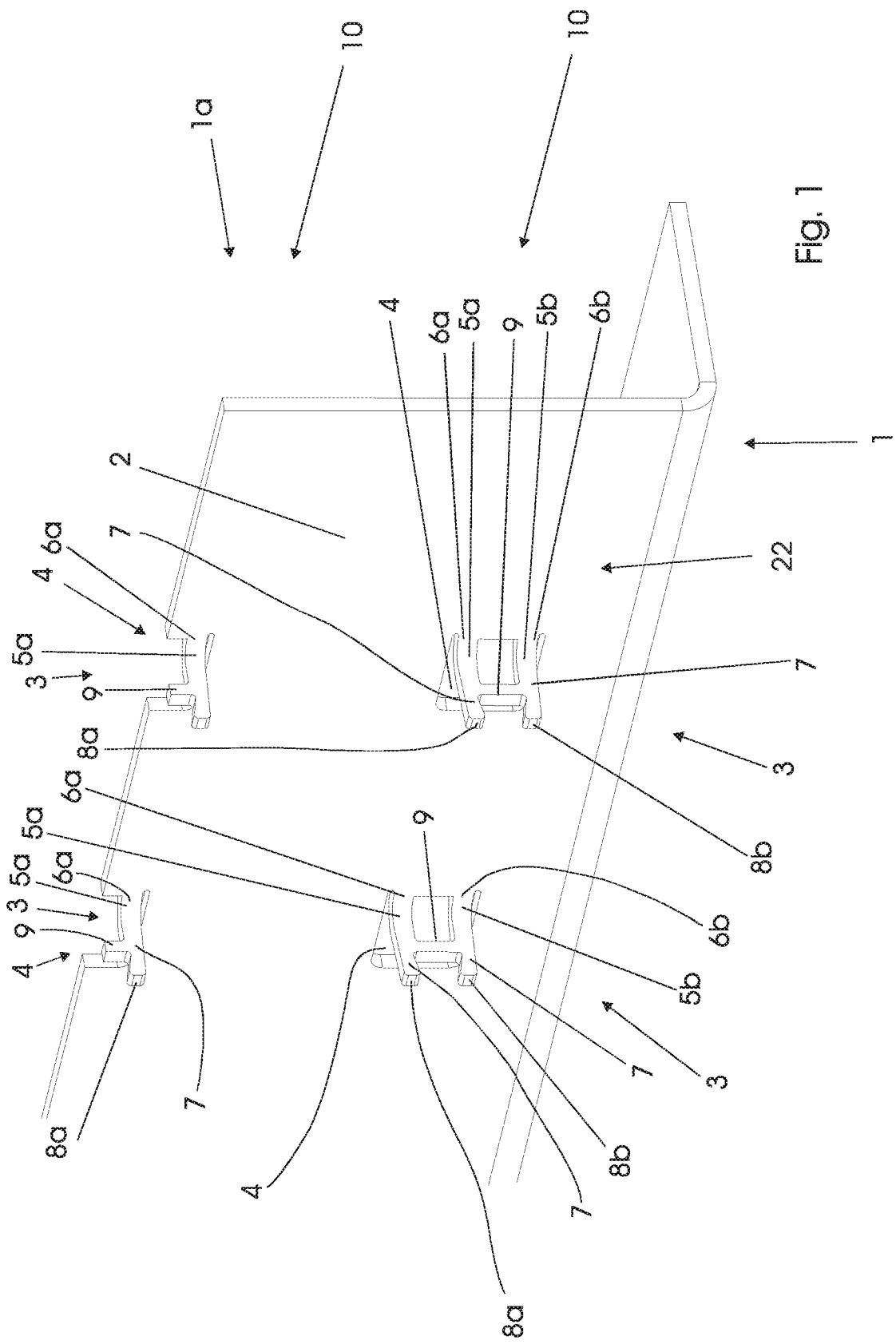

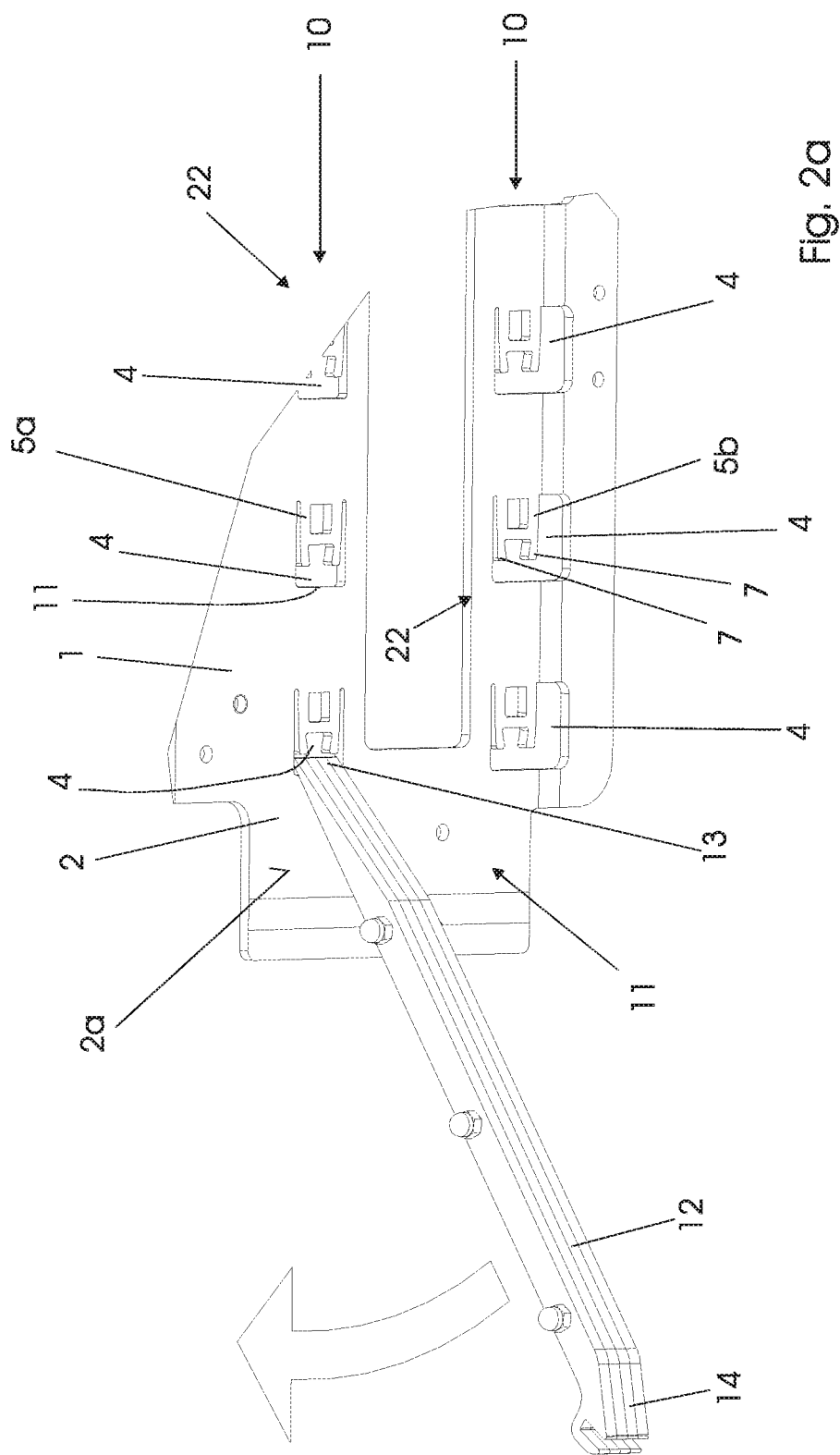

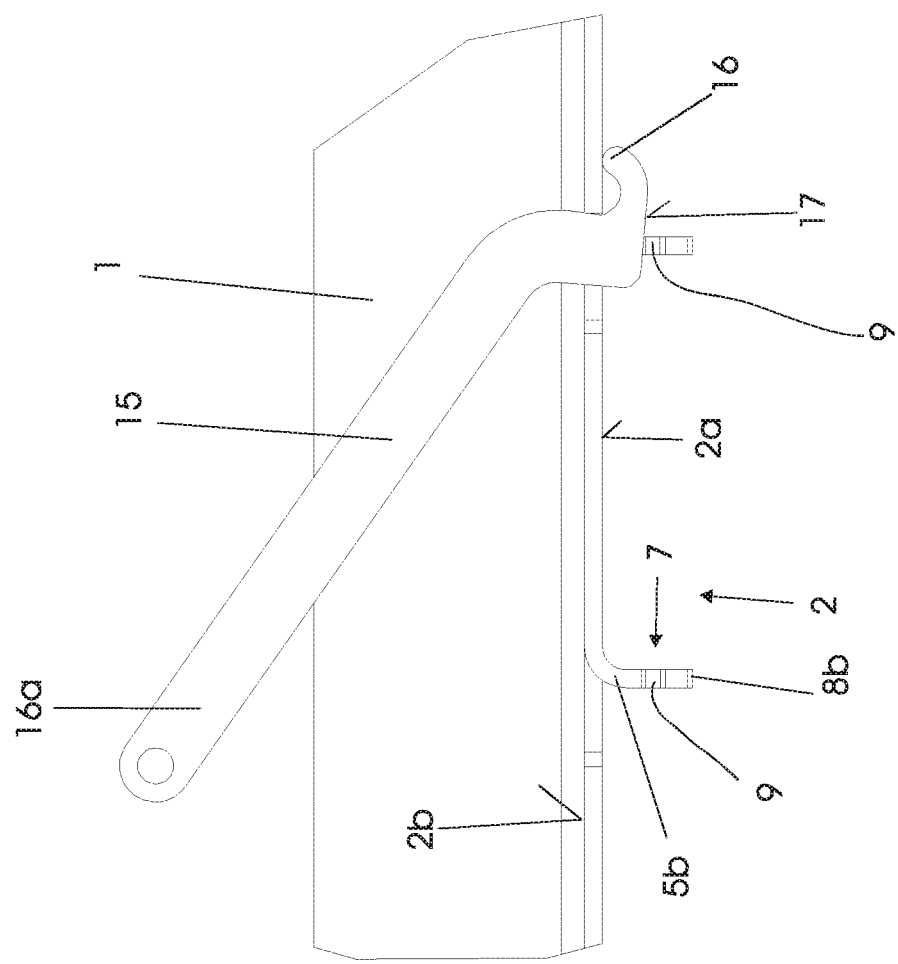

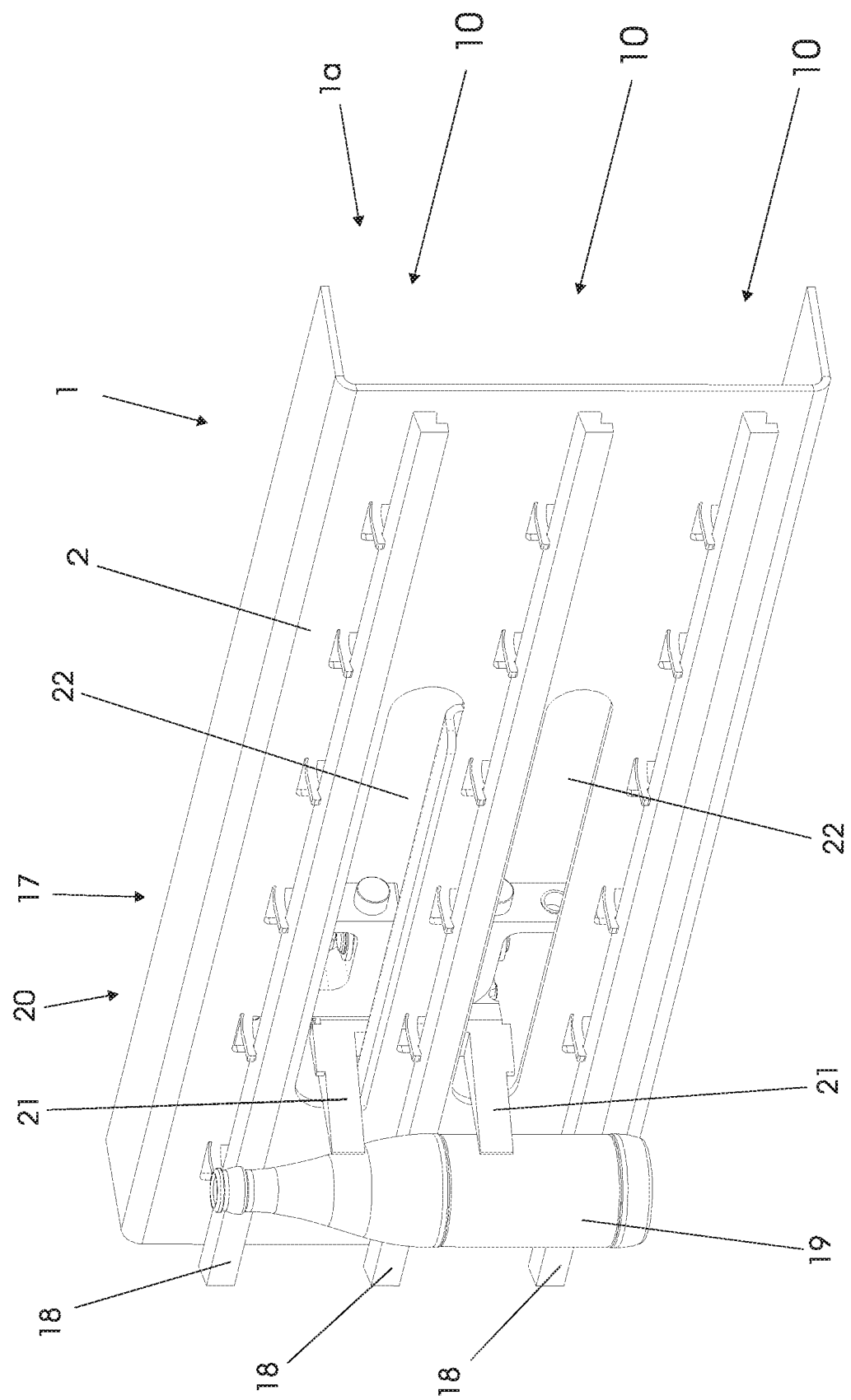

APPARATUS FOR GUIDING CONTAINERS FOR A CONVEYOR

RELATED APPLICATIONS

This is the national stage of international application PCT/EP2018/067402, filed on Jun. 28, 2018, which claims the benefit of the Jul. 7, 2017 priority date of German application 10 2017 115 239.3.

FIELD OF INVENTION

The invention relates to an apparatus for guiding containers and a method for producing the apparatus.

BACKGROUND

In a container treatment plant, it is often necessary to move containers along a path. Such containers include bottles, tetra packs, and similar containers. A transport device handles moving the container. However, it is often necessary to have a couple a guide to the transport apparatus so that the containers slide along the guide.

A typical container-treatment plant is called upon to handle many kinds of containers of different sizes and shapes. These are often called "container formats." Certain components of a container-treatment plant may change when the container format changes. These parts are often called "format parts." The guide is often such a format part. Thus, when switching over to a different container format, it is often necessary to also switch the guide.

Container guides are also susceptible to being contaminated by food, for example as a result of container breakage or of a container tipping over. It is therefore useful if the guide can be cleaned easily.

SUMMARY

An object of the present invention is that to provide, for containers, a guide that is easy to produce and rapidly interchangeable as well as being resistant to contamination and easy to clean.

The inventive apparatus for guiding containers comprises a surface-area portion with a multiplicity of through-passages and/or recesses and a multiplicity of retainers. At least one retainer is arranged in the region of a through-passage and/or of a recess and each retainer comprises at least one arched rail bar that is connected at a first end to the surface-area portion and at a second end lying opposite the first end to a rail support. The rail support comprises at least one support arm that is oriented largely square to the plane of the surface-area portion. Guide rails for guiding containers are also arranged directly on the support arms, with the surface-area portion of the main body and the retainer each being configured as one piece with rail bar, rail support and support arm.

The one-piece configuration makes the production of the apparatus for guiding (also referred to below as a "guide apparatus") particularly simple and rapid, since for example there is no need to assemble the apparatus from individual parts. The simple and rapid cleanability of the apparatus is also guaranteed because its one-piece form means there are few angled or poorly accessible regions.

The main body can be configured in any desired form. However, it is preferably plate-shaped or comprises at least one plate-shaped component. By "surface-area portion" is meant in particular a portion having a largely flat surface on which a plurality of retainer can be arranged in a row (linearly) one after the other. The surface-area portion can also be arched. A plurality of rows of retainer can also be arranged adjacent to one another. In this context, "one after the other" means in the longitudinal axis direction of the guide rail. The words "adjacent to one another" can therefore be understood as a direction square to the longitudinal axis direction of the guide rail.

Through-passages are for instance holes that pass right through the main body and have no opening to the outer edge. A recess on the other hand comprises an opening to the outer edge.

The retainer are provided to accommodate the guide rail, i.e., they are in direct contact with the guide rail. This contact is caused in particular by their support arms. The one-piece configuration of the main body and of the retainer is due in particular to the retainer and the main body being formed from the same workpiece. When the through-passages/recesses are created, the retainer is shaped in the workpiece (or from the already shaped main body), in particular stamped out or cut out. In the process the retainer remains connected by its rail bar to the main body (or to the workpiece residue) preferably at all times, including during and after manufacture.

Consequently the words "in the region of the through-passage/recess" must be understood to mean that before a subsequently performed bending operation in the through-passage or in the recess the retainer is arranged in particular flush with the front and rear surface of the main body and is connected to the main body by an edge of the through-passage/recess.

The rail bar was stamped out/cut out during the creation of the retainer. The bending movement is caused in a direction away from the surface of the surface-area portion. In its end position the rail bar preferably has a bending angle of approximately 90° so that at least the support arms of the supporting apparatus are arranged largely perpendicular to the plane of the surface-area portion, for example to the surface of the surface-area portion. The "arching" of the rail bar can be taken to mean that the median longitudinal axis of the rail bar comprises a radius and is not straight (linear). The term "arched rail bar" is therefore specifically not understood to mean a rail bar that is twisted about its longitudinal axis (e.g. helically).

The guide rail can be configured in the manner of a track. It can thus be provided to be pushed into the retainers, which are arranged one after another. It can comprise undercuts, recesses, grooves, through-passages, blind holes and/or detents for arranging on the at least one support arm. The guide rail comprises a contact face or sliding face on which the containers lie or slide along during transport. The guide rails can for instance comprise plastic or consist entirely of plastic, while the main body and the retainer are preferably of metal.

According to one embodiment of the invention the guide rail is connected to the at least one support arm without any other separately formed connecting means. As a result both the interchangeability of the guide rails and the cleanability of the apparatus as a whole is rendered especially simple to perform because contamination, especially in the region of connecting means, can often only be cleaned with difficulty, and the guide rails can also be replaced, e.g. when worn, without the time-consuming undoing of numerous connecting means.

The term "separate connecting means" refers to other components that are not configured as a single piece with the support arms and/or guide rail. Thus the guide rail for instance is in direct contact with the support arms. It is arranged for instance on the at least one support arm of each retainer.

Because no other connecting means such as for instance screws or adhesives are used, a clamping or latching connection is preferably configured between the support arm of the retainer and the guide rail. Corresponding latching means can for instance be formed from the support arm and/or the guide rail itself. The guide rail can for instance be configured so it can be clipped on to the support arm or support arms, and can accordingly comprise grooves/recesses, blind holes and/or through-passages for this purpose. Where a plurality of support arms are arranged on a retainer, the guide rail can also be arranged for instance between two or more support arms, e.g. can be clamped in between these support arms. The cleanability of the guide apparatus is further improved as a result.

For a particularly simple connection between the guide rail and the support arms of the rail support, in one embodiment of the invention there is provision for the rail support to have at least two support arms configured as one piece with the rail bar, the guide rail being arranged in particular between the support arms. This significantly improves a secure mounting of the guide rail. To improve stability yet further, the rail support can also comprise more than two support arms for connecting with the one guide rail. The at least two support arms can be arranged next to one another preferably in a direction square to the longitudinal direction of the guide rail.

In an especially preferable embodiment the rail support can also be configured to allow two or more guide rails to be attached to it, e.g., parallel to one another. To this end the rail support can comprise for instance two support arms with each support arm connected to a guide rail. These support arms too are arranged next to one another preferably in a direction square to the longitudinal direction of the guide rail. The rail support can also comprise more than two support arms, for instance four support arms. Two support arms together can be connected to a single guide rail. A variant having three support arms and in which two guide rails are in contact with the central support arm is also conceivable.

In order to improve the stability of the retainer, one embodiment of the invention makes provision for the retainer to comprise a rail bridge connecting at least two support arms and/or two rail bars. The rail bridge is connected to the two support arms and/or to the two rail bars. The rail bridge is part of the retainer and so is also configured as one piece with the support arms, rail bars and main body.

To improve the positioning of the guide rail on the support arms it is particularly preferable for the support arms to comprise a support for arranging the guide rail. The support is used for laying out the guide rail. The support can therefore be configured for example as a recess or projection on the support arm. It is particularly preferable for the rail bridge to be configured as a support so that the guide rail lies on the rail bridge formed between two support arms or between two rail bars and is for instance held with the free ends of the support arms.

The apparatus for guiding containers, i.e. the guide apparatus for the containers, is arranged particularly preferably in a container treatment plant. Here the apparatus for guiding containers can be deployed both at individual work stations such as cleaning devices, fillers or rinsers for instance, and in the transport regions between the individual work stations of the container treatment plant. The apparatus for guiding containers is used particularly preferably in a container stopper, in particular a bottle stopper, arranged in the container treatment plant. Because of its low overall depth the point of rotation of a stopper arm and the contact face of the guide rail are particularly close to one another. This keeps down the loads on the container stopper and the stopper can comprise a particularly short path of motion.

The object of the invention is further achieved by a method for producing an apparatus for guiding containers, having the following steps: providing a main body having a surface-area portion, producing through-passages and/or recesses in the surface-area portion, with at least one retainer for container guide rails being created in the region of each through-passage/each recess, with each retainer comprising at least one rail bar that has a rail support and that is connected to a main body edge of the recess, attaching a bending apparatus to the retainer, bending round the retainer in the region of the rail bar, with at least one support arm being positioned largely perpendicular to the plan of the surface-area portion and a portion of the rail bar being shaped in the form of an arch.

The main body consists preferably of metal. Accordingly the through-passages and/or recesses are produced for instance by way of a cutting or stamping method. A laser cutting method is used preferably because this facilitates a particularly accurate production of the through-passages/recesses and of the retainer. The rework effort is also limited with a laser cutting method. The through-passages/recesses and retainer provided to accommodate a guide rail are preferably arranged along a straight line (linearly) one after another.

After the through-passages and/or recesses and the retainer are formed, the retainer is bent in sections, i.e. the formed rail bars are for instance plastically deformed so that they adopt an arch-like shape. In this process the rail bars preferably receive an angle of approximately 90° so that at least the support arm and if required also the rail supports with the rail bridges are oriented square to the plane of the surface-area portion. Owing to the linear arrangement of the retainer, following the bending operation of all retainer in a row, the guide rails can be pushed onto or between the vertical support arms of the retainer.

According to one embodiment of the invention the bending of the retainer is caused by a bending apparatus that comprises or is configured as a bending tool such as a bending lever, for example. The bending apparatus can press the support arms out from the surface-area portion starting from the back. Here, the bending apparatus is configured for instance as a bending lever that is attached, starting from the back of the surface-area portion, to a rail bridge connecting two support arms and moved in the direction of the rearward surface of the main body. The retainer is moved from a starting position in which it is arranged largely flush with the surface-area portion to its end position (e.g. square to the surface of the surface-area portion). The bending of the retainer in the region of the rail bar is therefore caused by the movement of the bending apparatus.

As an alternative to the retainer being pressed out, according to one embodiment of the invention there is provision for the retainer to be bent by way of a bending apparatus that pulls the support arms out starting from the front of the surface-area portion.

In this case the bending apparatus can for instance also be configured as a bending lever. Starting from the front of the surface-area portion the bending lever is introduced by a free end into the through-passage and the retainer is engaged behind it, for example. Supported on an edge of the through-passage the bending apparatus is then moved toward the surface of the front of the surface-area portion so that the retainer is moved out of the surface of the surface-area portion from the starting position (flush with the surface-area portion). A gripping portion of a bending apparatus is subsequently arranged in the region of the free end of the retainer, e.g. by way of a groove, and bent into its end position by a pivoting motion of the bending apparatus toward that end of the retainer lying opposite the free end.

The bending of the retainer can be carried out mechanically, however it is carried out particularly preferably by hand with the aid of a manually operable bending apparatus, in particular a bending lever. As a result, short runs and spare parts in particular are simple to produce, and repairs or adjustments (maintenance) of the retainer can be carried out quickly and without difficulty.

BRIEF DESCRIPTION OF THE DRAWINGS

The invention is now presented by reference to a different embodiments. In the figures:

FIG. 1 shows a perspective view of a section of a main body with retainer;

FIG. 2a shows a perspective view of a section of a main body and a first bending apparatus in a starting position;

FIG. 3b shows the image of FIG. 3a in a horizontal section;

FIG. 4a shows a perspective view of an apparatus for guiding containers having a container stopper.

DETAILED DESCRIPTION

Figure 2B:
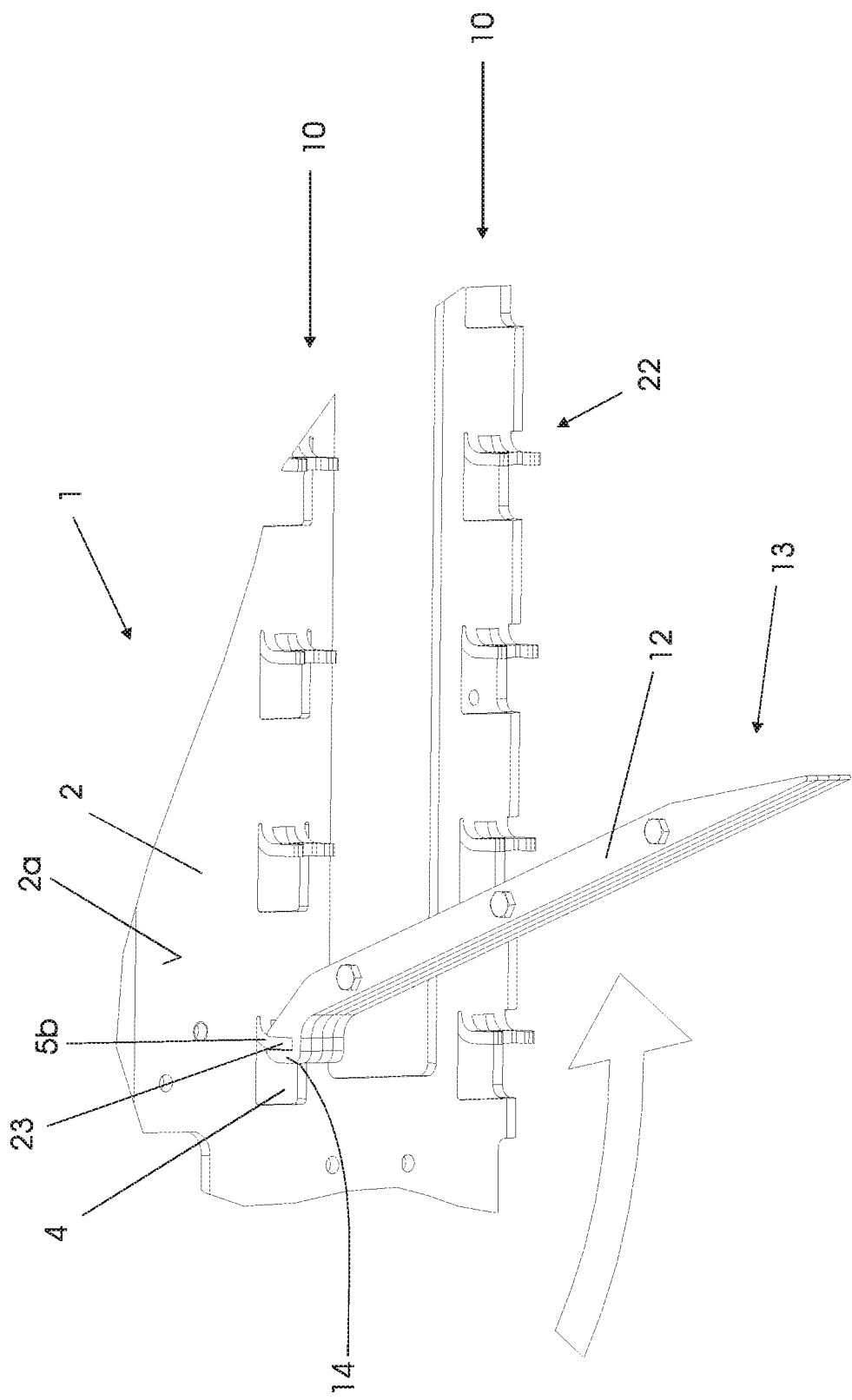
FIG. 2b shows the image of FIG. 2a with the bending apparatus in an end position.

FIG. 1 shows an article that has been manufactured from a single workpiece. For convenience of exposition, certain portions of this article are given different names. However, portions of the article never existed as separate components and were therefore never connected to each other. The various portions of the article continue to define a single integral structure.

The portions of the article includes a main body 1 with a surface-area portion 2, retainers 3, a rail support 22, arched rail bars 5a, 5b, support arms 7, and rail bridges 9.

The retainers 3 are arranged in two rows 10 on the main body 1. Only the retainers 3 near the end of the main body 1 are shown and only half of the retainers 3 in the upper row 10 can be seen.

Figure 4B:
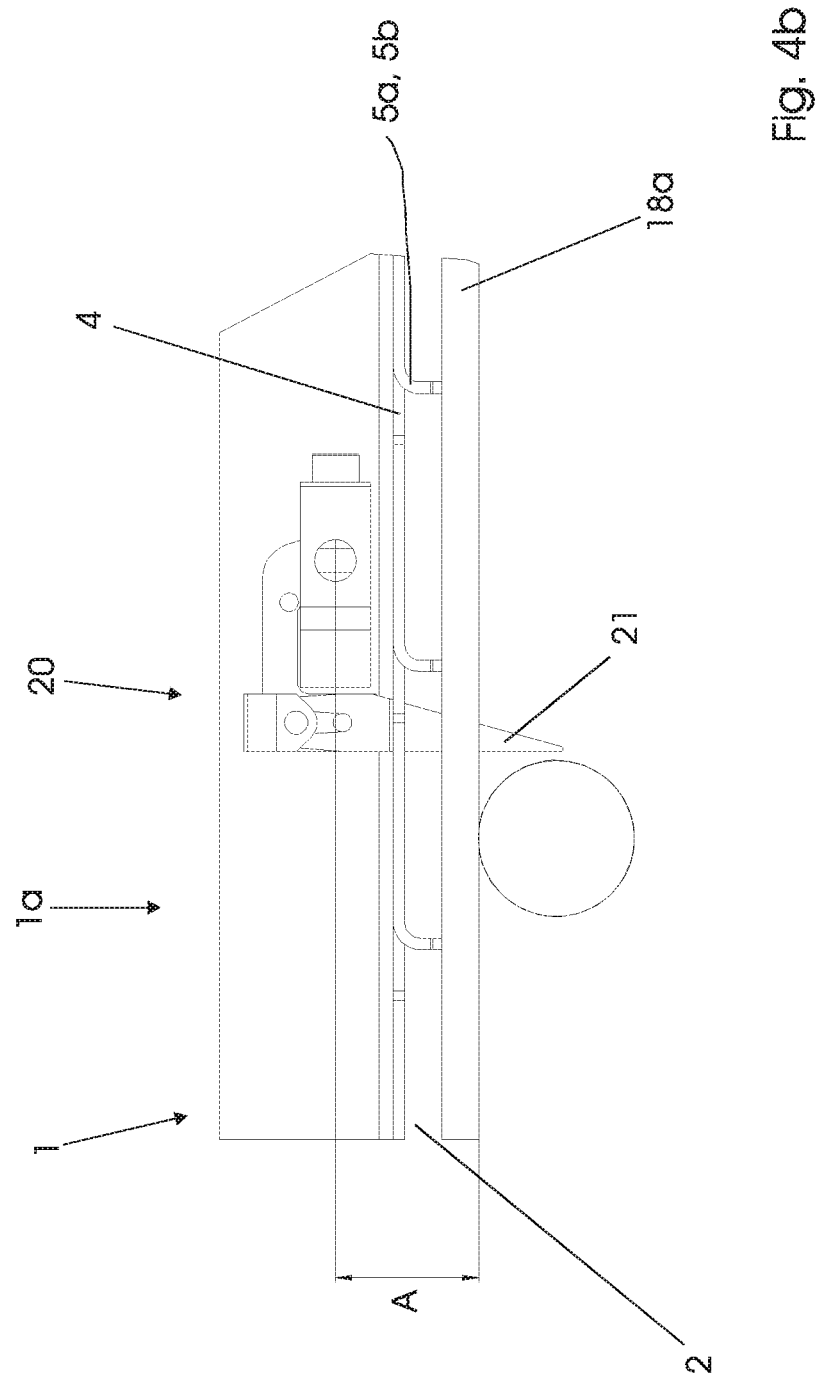
FIG. 4b shows the image of FIG. 4a in a horizontal section.

The rows 10 of retainers 3 are arranged next to one another. Within a row 10, the retainers 3 are arranged in a line that is parallel to a longitudinal axis of a guide rail 18. As shown in FIGS. 4 and 4b, the retainers 3 along a row 10 engage a guide rail 18 that has been pushed in towards the rail bridges 9.

Each retainer 3 is configured in a through-passage 4 through the main body 1. Alternatively the retainer 3 could also be arranged in the region of a recess. Such an arrangement would be present in an edge region of the main body 1 that is open to at least one side.

Each retainer 3 comprises the two rail bars 5a, 5b. Each rail bar 5a, 5b is formed by bending support arms 7 away from the main portion 1 by about ninety degrees. As a result, each support arm 7 is essentially perpendicular to the surface 2a of the surface-area portion 2.

A first end 6a, 6b of each rail bar 5a, 5b merges with the surface-area portion 2 to form a single piece. A second end, which lies opposite the first end 6a, 6b, connects to a rail support 22 that has two support arms 7, each of which comprises a free end 8a, 8b.

A rail bridge 9 bridges a gap between the two support arms 7. As a result, the support arms 7 and the rail bridge 9 define a U-shaped profile.

The main body 1 and the retainer 3 with the rail support 22, the rail bars 5a, 5b, the support arms 7 and the rail bridges 9 are configured as a single piece. This means that they are manufactured from a single workpiece. The individual components never existed as single pieces. As a result, they were never interconnected subsequent to their formation since they were all formed together.

In the illustrated embodiment, each rail bridge 9 functions as a support. In an alternative embodiment, each rail bridge 9 is a connecting element rather than a support.

The free ends 8a, 8b of the support arms 7 thicken along a direction perpendicular to the longitudinal axis. As a result, the free ends 8a, 8b are able to attach the guide rail 18 to the retainer 3. This renders superfluous other connecting means. Thus, other separate connecting means need not be used. In particular, neither mechanical connecting means, such as screws, nor adhesives, are used to connect or fasten the guide rail 18 to the retainer 3.

In an alternative embodiment, a retainer 3 has only one rail bar 5a, 5b and one rail support 22 with only one support arm 7. Such a support arm 7 is one that is shaped like a pin. In such embodiments, the guide rail 18 pushes onto this pin-like support arm 7.

In other embodiments, each retainer 3 includes a rail support 22 having more than two support arms 7. Among these are embodiments in which there are three or four support arms 7. As a result, in these embodiments, it is possible to arrange a corresponding plurality of guide rails 18 on the retainer 3.

FIGS. 2a and 2b show a bending apparatus. The illustrated bending apparatus includes first bending tool 12 having a first end 13 and a second end 14. The second end 14 is formed as a gripper tool. In the illustrated embodiments, the bending tool 12 is a bending lever that bends the retainer 3 from its starting position, which is shown in FIG. 2a, to its ending position, which is shown in FIG. 2b.

The bending operation occurs in two stages. In some practices, a different bending tool is used for each stage. In other practices, different sections of the bending tool 12 are used for each stage.

FIG. 2a shows a main body 1 in which the through-passages 4 have already been formed with the retainer 3 in a starting position. The retainer 3 is configured as shown in FIG. 1.

To bend the retainer 3 into its end position, in which it is bent 90° relative to the plane of the surface-area portion 2, the first bending tool 12 is inserted with its first end 13 into a through-passage 4. In this position, an edge 11 of the through passage 4 supports the bending tool 12 as its first end 13 engages behind the free ends 8a, 8b of the support arms 7.

FIG. 2a shows a first step in which the bending tool 12 is pivoted so that its second end 14 moves toward the front surface 2a of the surface-area portion 2. This forces the retainer 3 to moved slightly out from the front surface 2a.

FIG. 2b shows a second step in which the gripper tool at the second end 14 grips the free ends 8a, 8b are gripped by a gripper tool 14 and bends them their end positions. In the illustrated embodiment, the end position is one in which the gripper tool bends them 90° away from the surface 2a of the surface-area portion 2.

In the illustrated embodiments, the second end 14 has a slot-shaped recess 23 or channel that fits onto the free ends 8a, 8b to form the gripper tool. However, in other embodiments, the gripper tool is a separate bending tool.

Figure 3A:
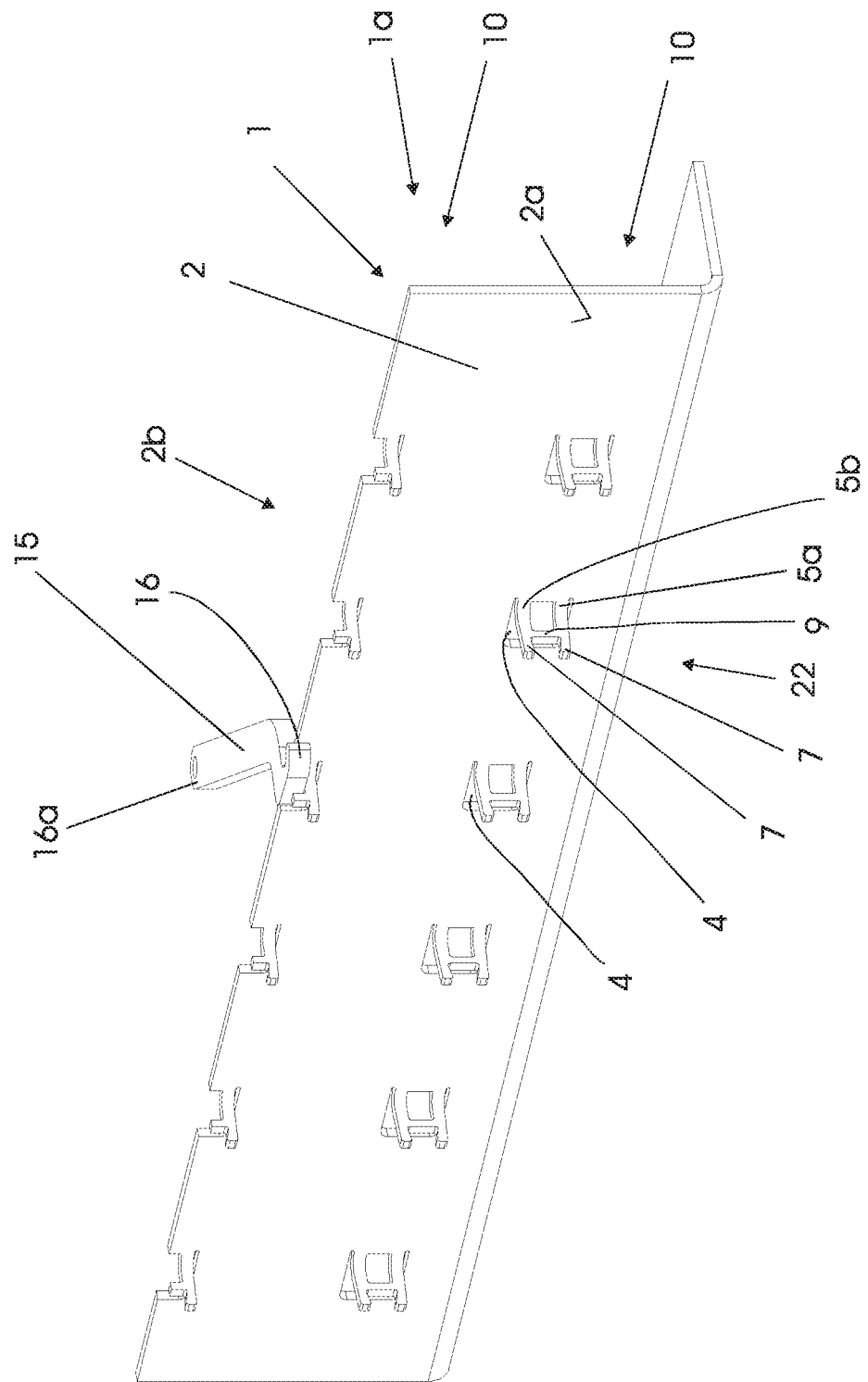
FIG. 3a shows a perspective view of a section of a main body with a second bending apparatus.

FIGS. 3a and 3b show a second bending tool 15 that is also configured as a bending lever. The second bending tool 15 carries out a second bending method in which a single-stage bending movement bends the retainer 3 from its starting position, in which it is flush with the surfaces 2a, 2b of the surface-area portion 2, to its end position, in which it has been bent by 90° relative to the surface of the surface-area portion 2. Both FIGS. 3a, 3b show a retainer 3 in its end position with the second bending tool 15 still attached to the retainer 3.

In the second bending method, the bending begins from behind of the main body 1, with the second bending tool 15 being moved with a hook-shaped free end 16 through the through-passage 4. In this embodiment, the front surface 2a supports a hook-shaped free end 16.

The second tool 15 grips with a contact face 17 in the region of the rail bridge 9 that connects the two support arms 7. In order to bend the retainer 3 into its end position, the free second end 16a, which lies opposite the hook-shaped end 16 of the second bending tool 15, is moved toward the rearward surface 2b of the main body 1. With this movement the retainer 3 is pressed outward from the front surface 2a and raised into its end position, which in this case is one that results from a 90° bending angle between the support arm 7 and the front surface 2a of the surface-area portion 2.

In contrast to the two-stage bending method described earlier, this single-stage bending method causes the retainer 3 to be pushed out of the through-passage 4.

An advantage of the first bending method is that it can be used with the retainer 3 that has one or more support arms 7. An advantage of the second bending method is that it reduces the possibility of an unintended distortion of the support arms 7. Such distortion would make it difficult to push in the guide rail 18 under certain circumstances.

Both bending operations can be performed mechanically. This is useful for mass production.

Alternatively, the bending tools 12, 15 can also be operated manually by a person. The manually operable bending tools 12, 15 guarantee a particularly high precision such that any additional reworking or aligning of the retainer 3 is rendered largely unnecessary. With one-off production in particular, it is a simple matter to quickly and easily create a guide for guiding the containers 19 using a manually operable bending tools 12, 15. Supplying spare parts is also particularly simple to manage based on the manual bending method. As shown in FIGS. 2a-3b, the bending tools 12, 15 can be understood as bending apparatuses or alternatively configured as part of a bending apparatus.

FIG. 4a and FIG. 4b show the apparatus for guiding the containers 19 in combination with a container stopper 20. The guide comprises a main body 1 with a surface-area portion 2. The retainers 3, which are like those shown in FIGS. 1-3b, are arranged along rows 10 with the retainer 3 in the main body 1. A guide rail 18 has been pushed into engagement with the retainers 3 of a row 10. The guide rails 18 are connected to the retainer 3 without any other separate connecting means, i.e. they are held on the retainer 3 purely by virtue of the geometry of the support arms 7 and the matching geometry of the guide rails 18.

FIGS. 4a and 4b show a container 19, in this case a bottle, which lies against two stopper arms 21. Two further through-passages 22 through which the stopper arms 21 project starting from the back of the main body 1 are arranged in the main body 1 for the two stopper arms 21 of the container stopper 20. The container stopper 20 is arranged on the back of main body 1 and can be displaced in the longitudinal axis direction of the guide rails 18.

The stopper arms 21 can be moved between a stop position shown here, in which the container 19 lies against the stopper arms 21, and a release position in which the container 19 slides along the guide rails 18. The apparatus for guiding the containers 19 facilitates a particularly low overall depth, with the result that a distance A between the guide rail 18 and the point of rotation of the stopper arms 21 is particularly short. This allows the stopper arms 21 to be particularly short and to keep the operational loads on the container stopper 20 low.

The embodiments shown in FIGS. 1-4b feature a metal main body 1, metal retainers 3, and metal guide rails 18. However, in other embodiments, one or more of these can be plastic.

Having described the invention and a preferred embodiment thereof, what is claimed as new and secured by Letters Patent is:

1. An apparatus comprising a container guide for guiding a container, said container guide comprising a guide rail and a single piece having a main body and retainers, at least one of said retainers being arranged in at least one of a through passage and a recess in a surface-area portion of said main body, wherein each of said retainers comprises a bent rail bar and a rail support, wherein a portion of said rail support comprises a support arm that is oriented to be perpendicular to a plane defined by said surface-area portion of said main body, and wherein said guide rail is arranged directly on said support arms for guiding said container.

2. The apparatus of claim 1, wherein said guide rail connects to said support arm without any other separately configured connecting means.

3. The apparatus of claim 1, wherein said support arm is a first support arm, wherein said apparatus further comprises a second support arm, said first and second support arms being configured as a single piece with said rail support, wherein said guide rail is arranged between said first and second support arms.

4. The apparatus of claim 1, wherein said guide rail is a first guide rail, wherein said apparatus further comprises a second guide rail, said first and second guide rails being attached to said rail support said that said first and second guide rails are parallel to each other.

5. The apparatus of claim 1, wherein said support arm is a first support arm, wherein each of said retainers comprises a second support arm and a rail bridge that that connects between said first and second support arms.

6. The apparatus of claim 1, wherein said rail bar is a first rail bar, wherein each of said retainers comprises a second rail bar and a rail bridge that that connects between said first and second rail bars.

7. The apparatus of claim 1, wherein said support arm comprises a support upon which said guide rail is arranged.

8. The apparatus of claim 1, wherein said support arm is a first support arm and wherein each of said retainers comprise a second support arm and a rail bridge that extends between said first and second support arms and that supports a section of said guide rail.

9. The apparatus of claim 1, further comprising a container-treatment plant, wherein said container-treatment plant comprises said container guide.

10. The apparatus of claim 1, further comprising a container-treatment plant, wherein said container-treatment plant comprises a container stopper in which is arranged said container guide.

11. A method comprising producing a container guide, wherein producing said container guide comprises providing a main body that has a surface-area portion, producing at least one of through-passages and recesses in said surface-area portion, producing at least one retainer for retaining a container guide rail in a region of at least one of said through passages and recesses, wherein each retainer comprises rail bars connected to said main body and a rail support with a support arm, using a bending apparatus, bending said retainer in a region of said rail bars, wherein said support arm is oriented to extend perpendicular to a plane defined by said surface-area portion and wherein said rail bar is made to define an arch.

12. The method of claim 11, wherein bending said retainer comprises using said bending apparatus to press said support arms starting from a back of said main body such that said support arms bend outward from a front surface of said surface-area portion.

13. The method of claim 11, wherein bending said retainer comprises using said bending apparatus to pull out said support arms starting from a front surface of said surface-area portion.

14. The method of claim 11, wherein bending said retainer comprises using a manually-operable bending apparatus.

15. The method of claim 11, wherein bending said retainer comprises using a bending lever.

16. An apparatus for guiding containers having a main body which comprises a surface-area portion having a multiplicity of through-passages and/or recesses, a multiplicity of retaining means, with at least one retaining means each being arranged in the region of a through-passage and/or of a recess, and each retaining means comprises at least one bent rail bar which is connected at a first end with the surface-area portion and at a second end lying opposite the first end with a rail support, with the rail support comprising at least one support arm which is oriented largely square to the plane of the surface-area portion, and a guide rail arranged directly on the support arms for the guiding of containers wherein the surface-area portion of the main body and the retaining means being configured as a single piece with rail bar, rail support and support arm.

17. The apparatus of claim 16, wherein the guide rail is connected to the at least one support arm without any other separately configured connecting means.

18. The apparatus of claim 16, wherein the rail support comprises two support arms configured as a single piece with the rail bar, with the guide rail arranged in particular between the support arms.

19. The apparatus of claim 16, wherein two or more guide rails are attached to the rail support parallel and next to one another.

20. The apparatus of claim 16, wherein the retaining means comprises a rail bridge connecting at least two support arms and/or two rail bars.

* * * * *